Figure 1:
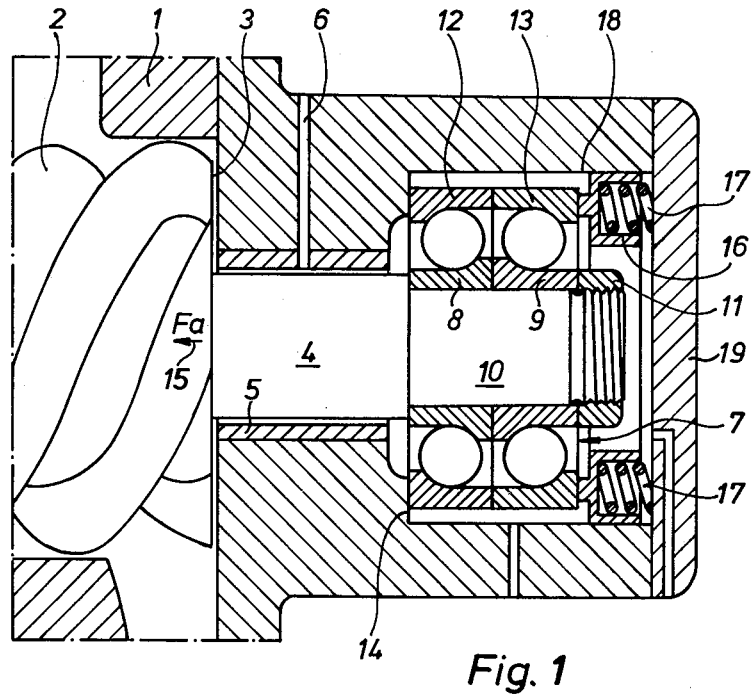

United States Patent [19]

Lundberg

[11] 4,227,755
[45] Oct. 14, 1980

[54] BEARING ARRANGEMENT FOR SHAFT OF ROTARY COMPRESSOR

[75] Inventor: Anders Lundberg, Norrkoping, Sweden

[73] Assignee: Stal Refrigeration AB, Norrkoping, Sweden

[21] Appl. No.: 952,795

[22] Filed: Oct. 19, 1978

[30] Foreign Application Priority Data

Oct. 24, 1977 [SE] Sweden ............................... 7711928

[51] Int. Cl.³ .............................................. F16C 27/04
[52] U.S. Cl. ................................... 308/184 R; 308/9
[58] Field of Search .................... 308/26, 176, 184 R, 308/184 A, 189 R, 189 A, 9

[56] References Cited

U.S. PATENT DOCUMENTS

| 1,979,663 | 11/1934 | Bickelhaupt et al. | 308/184 R |
| 2,012,997 | 9/1935 | Junkers | 308/26 |
| 2,487,343 | 11/1949 | Kopf | 308/184 R |
| 2,499,131 | 2/1950 | Coles | 308/184 R |

FOREIGN PATENT DOCUMENTS

| 488871 | 12/1952 | Canada | 308/184 R |
| 2807411 | 8/1978 | Fed. Rep. of Germany | 308/189 A |
| 1157865 | 6/1958 | France | 308/189 R |
| 200452 | 7/1923 | United Kingdom | 308/184 R |

Primary Examiner—Richard R. Stearns
Attorney, Agent, or Firm—Cyrus S. Hapgood

[57] ABSTRACT

A slide bearing journals the rotor shaft in the compressor housing with a clearance radially of the shaft; and an anti-friction bearing mounted on the shaft journals it axially thereof, the housing having a fixed support surface against which the anti-friction bearing abuts axially in one direction and which allows radial movement thereof. Yielding means are provided to press the anti-friction bearing against the support surface with a predetermined precise force.

7 Claims, 3 Drawing Figures

BEARING ARRANGEMENT FOR SHAFT OF ROTARY COMPRESSOR

The present invention relates to an arrangement in a compressor of the rotary type for fixing the rotor shaft in the axial direction, the rotor shaft being journalled with a clearance in the radial direction in a slide bearing and being journalled in the axial direction by an antifriction bearing. The latter is mounted on the shaft and abuts axially in one direction against a fixed support surface of the compressor housing, which support surface allows a radial movement of the antifriction bearing, a means being provided to keep the antifriction bearing pressed against the support surface.

In this usual kind of compressor to which the invention is applicable, the medium which is compressed acts on the rotor (or rotors) with both an axial force and a radial force. The axial force acts mainly in only one direction and increases upon an increase in the load on the rotor from the medium which is compressed; and this axial force is transferred to the compressor housing by the antifriction bearing via said support surface. The radial force, on the contrary, is transferred to the compressor housing by slide bearings. In order that the slide bearings shall function, it is required that they accommodate radial movement of the rotor shaft. Therefore, the antifriction bearing is arranged so that it can move in the radial direction relative to the support surface.

The antifriction bearing must be kept pressed against the support surface also when the axial force on the rotor from the compressed medium has ceased, as when the compressor runs idle, so that the end surface of the rotor cannot come into contact with the compressor housing, which could result in breakdown of the compressor.

It is known in screw compressors to keep the antifriction bearing pressed against the support surface with a threaded annular element which is screwed against the outer ring of the antifriction bearing. However, this element must be screwed with an exact degree of tightness against the outer ring, which can be difficult to accomplish. If the annular element abuts too tightly against the antifriction bearing, it becomes difficult for the antifriction bearing to move in the radial direction, so that the antifriction bearing also will take up radial forces and thereby reduce its length of life. If the annular element instead abuts too loosely against the antifriction bearing, the outer ring of the bearing can start slipping against the support surface and the annular element, which can result in damage. Moreover, if there is a clearance between the annular element and the antifriction bearing, there is a risk that certain end surfaces of the rotor of the compressor will come into contact with the compressor housing, which can result in breakdown.

These inconveniences are avoided through the invention by means of a yielding element which keeps the antifriction bearing pressed against the support surface with a precise force. Such means can effectively prevent the rotor of the compressor from moving in the axial direction without restricting the necessary freedom of movement of the antifriction bearing in the radial direction.

According to one form of the invention, the yielding element is arranged to act directly on the antifriction bearing. In this way, no further axial bearings are required to transfer the force from the yielding element to the antifriction bearing.

According to another form of the invention, the yielding element consists of a part which keeps the antifriction bearing pressed against the support surface by separate springs. This arrangement makes it possible to use standard springs, which, of course, is advantageous.

According to a further form of the invention, the yielding element consists of an annular so-called cup spring. Such a spring has the advantage that it takes up a small space at the side of the antifriction bearing.

According to still another form of the invention, the yielding element consists of a part which keeps the antifriction bearing pressed against the support surface by fluid pressure. In this way, the force of the part against the antifriction bearing can easily be adjusted to prevailing operating conditions by changing the fluid pressure. For example, the force can be eliminated when the compressor is in operation, if so desired.

Figure 2:
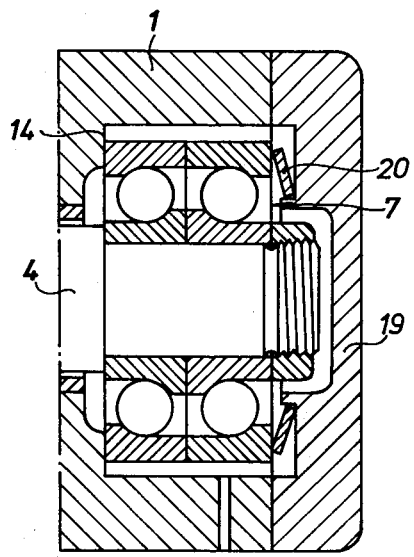
Figure 3:
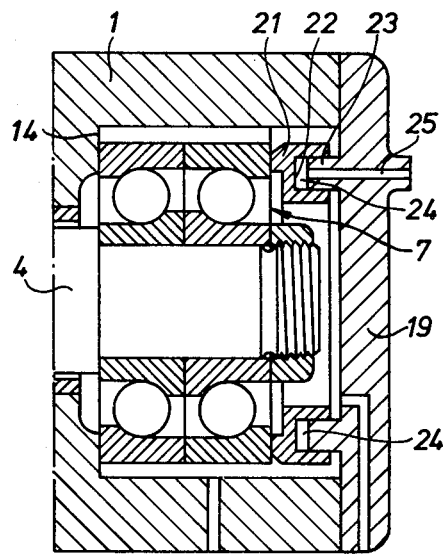

Three embodiments of the invention are described below in connection with the attached drawing, in which FIG. 1 shows a longitudinal sectional view of an arrangement where an annular part, by means of helical springs, keeps an antifriction bearing of a screw compressor fixed in the axial direction;

FIG. 2 is a similar view showing how the fixing in the axial direction is accomplished by a so-called cup spring, and FIG. 3 is a similar view showing how the fixing is accomplished by a fluid-influenced annular part.

The housing of a screw compressor is shown at 1. Two screw-formed rotors, of which only a part 2 of one of them is shown in FIG. 1, are enclosed in the housing 1. From the two end surfaces of the rotor 2, of which only one end surface 3 is shown in FIG. 1, stub shafts protrude which are journalled in the radial direction in the housing 1.

The stub shaft 4 protruding from the end surface 3 is journalled in the radial direction by a bearing sleeve 5, which is supplied with lubricant (oil) through a channel 6. The shaft 4, and thus the rotor 2, is journalled in the axial direction by an antifriction bearing 7 having two inner bearing rings 8 and 9, respectively, which are mounted on an outer part 10 of the shaft 4 by a nut 11. The antifriction bearing 7 also has two outer bearing rings 12 and 13, respectively, and roll bodies located between the inner and outer bearing rings.

The bearing ring 12 is supported in the axial direction by a radial surface 14 of the housing 1.

When the compressor is in operation, the rotor 2 is exposed to both a raidal and an axial force from the medium which is compressed. The axial force $F_a$, through which the compressed medium acts on the rotor 2, is assumed in the drawing to act in the direction of the arrow 15. When the load on the rotors from the medium which is compressed is increased, the axial force $F_a$ increases.

When the rotors are unloaded by said medium, a possible axial movement of the rotor 2 in a direction opposite to the direction of the arrow 15 is prevented by an annular part 16 which is kept pressed against the bearing ring 13 by helical springs 17, thus keeping the bearing 7 fixed in the axial direction. The annular part 16 is movable in the axial direction in the housing 1 in a cylindrical bore 18, which prevents the part 16 from moving radially relative to the housing 1. An end cover 19 of the housing 1 serves as a support for the springs 17.

In the embodiment according to FIG. 2, a so-called cup spring 20 is arranged in the end cover 19 and, with a certain prestress, keeps the antifriction bearing 7 pressed against the support surface 14, thereby fixing the bearing 7 in the axial direction while allowing the bearing 7 to move in the radial direction.

In the embodiment according to FIG. 3, the pressure of a fluid keeps an annular part 21 presed against the bearing 7 so that the latter is pressed against the support surface 14. The part 21 has an annular groove 22 which, together with an annular rim 23 of the end cover 19, forms a chamber 24 in which said fluid pressure acts on the part 21. The chamber 24 communicates with a suitable pressure source through a channel 25.

It will be apparent that in each of the illustrated embodiments, the housing 1, 19 includes means holding the yielding means 16, 20 or 21 against radial movement relative to the housing, such holding means being the wall of bore 18 in FIG. 1, the annular internal rim of cover 19 in FIG. 2, and the annular internal rim 23 of the cover in FIG. 3.

It will also be apparent that anti-friction bearing 7 journals the rotor 2 and its shaft 4 axially in both directions. More particularly, in the illustrated embodiments the inner and outer bearing rings 8–9 and 12–13 and the intermediate roll bodies constitute anti-friction means holding shaft 4 against axial displacement in both directions while bearing 7 is pressed against the support surface 14.

I claim:

1. In a rotary compressor, the combination of a housing, a rotor mounted in the housing and having a shaft, the rotor and shaft being subjected to an axial force in one direction while the compressor is loaded and tending to move axially in the opposite direction when the compressor is unloaded, a slide bearing in which the shaft is journalled in the housing with a clearance radially of the shaft, an anti-friction bearing mounted on the shaft and journalled to the shaft to hold the shaft against axial displacement in either direction with respect to said anti-friction bearing, the housing having a fixed support surface against which the anti-friction bearing abuts axially in said one direction and which allows radial movement of the anti-friction bearing, and yielding means pressing the anti-friction bearing against said support surface with a predetermined precise force, the anti-friction bearing including anti-friction means holding the shaft against axial displacement in both directions while the anti-friction bearing is pressed against said support surface.

2. The combination of claim 1, in which said yielding means include a yielding element acting directly on the anti-friction bearing.

3. The combination of claim 2, in which said yielding means also include separate springs acting on said yielding element.

4. The combination of claim 2, in which said yielding element is a cup spring.

5. The combination of claim 2, in which said yielding means also include means for applying a fluid pressure against said yielding element to press the anti-friction bearing against said support surface.

6. The combination of claim 1, in which said yielding means are spring means.

7. The combination of claim 1, in which said housing includes means holding said yielding means against radial movement relative to the housing.

* * * * *